United States Patent [19]

Kovats

[11] Patent Number: 4,597,710
[45] Date of Patent: Jul. 1, 1986

[54] TRASH COLLECTION VEHICLE SIDE-LOADING APPARATUS

[75] Inventor: Lawrence H. G. Kovats, Raleigh, N.C.

[73] Assignee: Athey Products Corporation, Wake Forest, N.C.

[21] Appl. No.: 675,958

[22] Filed: Nov. 28, 1984

[51] Int. Cl.⁴ .............................................. B65G 67/04
[52] U.S. Cl. ..................................... 414/409; 187/32; 414/422; 414/673; 414/648; 414/642
[58] Field of Search .............. 414/408, 409, 422, 403, 414/404, 673, 406, 641, 642, 648, 649; 187/64, 32, 34

[56] References Cited

U.S. PATENT DOCUMENTS

| 753,570 | 3/1904 | Hall ................................. 187/34 X |
| 1,492,675 | 5/1924 | Clark et al. . |
| 1,687,278 | 10/1928 | Allen . |
| 1,920,243 | 8/1933 | Casper . |
| 1,953,579 | 4/1934 | Zeuthen . |
| 1,959,786 | 5/1934 | Hodgkinson ...................... 187/34 X |
| 2,262,933 | 11/1941 | Heinmiller ....................... 187/67 X |
| 2,522,441 | 9/1950 | Galloway et al. . |
| 2,592,324 | 4/1952 | Oliver . |
| 2,647,651 | 8/1953 | Vincent .............................. 414/648 |
| 3,174,636 | 3/1965 | Dempster et al. . |
| 3,279,635 | 10/1966 | Avery et al. .................... 414/648 X |
| 3,282,453 | 11/1966 | Wood . |
| 4,219,298 | 8/1980 | Stragier et al. ..................... 414/409 |
| 4,313,707 | 2/1982 | Bingman et al. . |
| 4,427,333 | 1/1984 | Ebeling . |

FOREIGN PATENT DOCUMENTS

| 934547 | 10/1955 | Fed. Rep. of Germany ........ 187/34 |
| 1067575 | 10/1959 | Fed. Rep. of Germany ...... 414/648 |

OTHER PUBLICATIONS

Athey Publications—Form Nos. SL584S, CWC 300584S, & 18A24A884S.

Primary Examiner—Frank E. Werner
Attorney, Agent, or Firm—B. B. Olive

[57] ABSTRACT

Improvements are described for the type of trash collection apparatus mounted on a side-loading trash collection vehicle of the type in which a container carriage moves up and down on vertical guide rails. The improvements comprise providing pairs of guide rails on each side of the carriage with one set of guide rails being entirely vertical and the other set of guide rails having upper end portions which are curved towards the receptacle into which the container is dumped. An improved apparatus for slowing the speed of and stopping the carriage at the end of its upper travel to ensure proper orientation of the carriage wheels during return of the carriage to the ground position is also described.

3 Claims, 10 Drawing Figures

TRASH COLLECTION VEHICLE SIDE-LOADING APPARATUS

TECHNICAL FIELD

The invention apparatus relates to trash collection apparatus for attachment to vehicles used for trash and other waste collection.

BACKGROUND ART

Because of the increasing quantities of trash and waste requiring collection, there remains a need to improve the reliability and efficiency of trash collection apparatus. It has been known in the prior art to provide apparatus for lifting a trash container from the ground and dumping the container into a collection vehicle or truck. Some of such lifting mechanisms have elevated the trash container over the side of the vehicle whereas other lifting mechanisms have been arranged to lift the trash container over the front or back of the vehicle. A typical arrangement has been to employ tracks or rails with means to guide the container along the tracks or rails from a pick-up position to a dump position and return.

Of specific interest to the present invention, it has been known to provide an apparatus for lifting a container with a lifting apparatus that rides on rollers which follow separate tracks on opposite sides of the container. U.S. Pat. No. 4,313,707 exemplifies this construction.

DISCLOSURE OF INVENTION

The trash collection apparatus of the invention according to the illustrated embodiment incorporates a frame mounted on a trash collection vehicle below the body of the vehicle in which the trash is collected. The frame is movable laterally of the vehicle body by means of a hydraulic cylinder and piston rod arrangement. A pair of uniquely-shaped carriage guide rails are secured on both sides of the frame and extend upwardly along the vehicle and move in and out with the frame. Such a laterally-movable frame supporting vertical rails has been known in U.S. Pat. No. 4,313,707. The present invention is primarily directed to an improved rail construction and also to an improved means for orienting the carriage during return to ground. The invention in one aspect is concerned with one of the guide rails on one side of the frame being straight whereas the other guide rail on the same side of the frame incorporates a curved and horizontal top section. A carriage is mounted on rollers with an upper roller and a lower roller being provided on each side of the carriage. The rollers ride in the rails and the lower roller always remains in the straight rail whereas the upper roller rides in the rail having the curved and horizontal section at its upper end. The carriage is made to ascend and descend along the guide rails by means of a hydraulic piston driven chain arrangement and with means to control carriage speed in various stages of ascent and descent. The container is held on the carriage by means of a pair of jaws which are hydraulically actuated. As another aspect of the invention, a spring-loaded stop and overtravel arrangement at the top of the vertical rails assures correct orientation of the carriage on the rails when returned to ground position.

BEST MODE FOR CARRYING OUT THE INVENTION

Figures 1, 2:
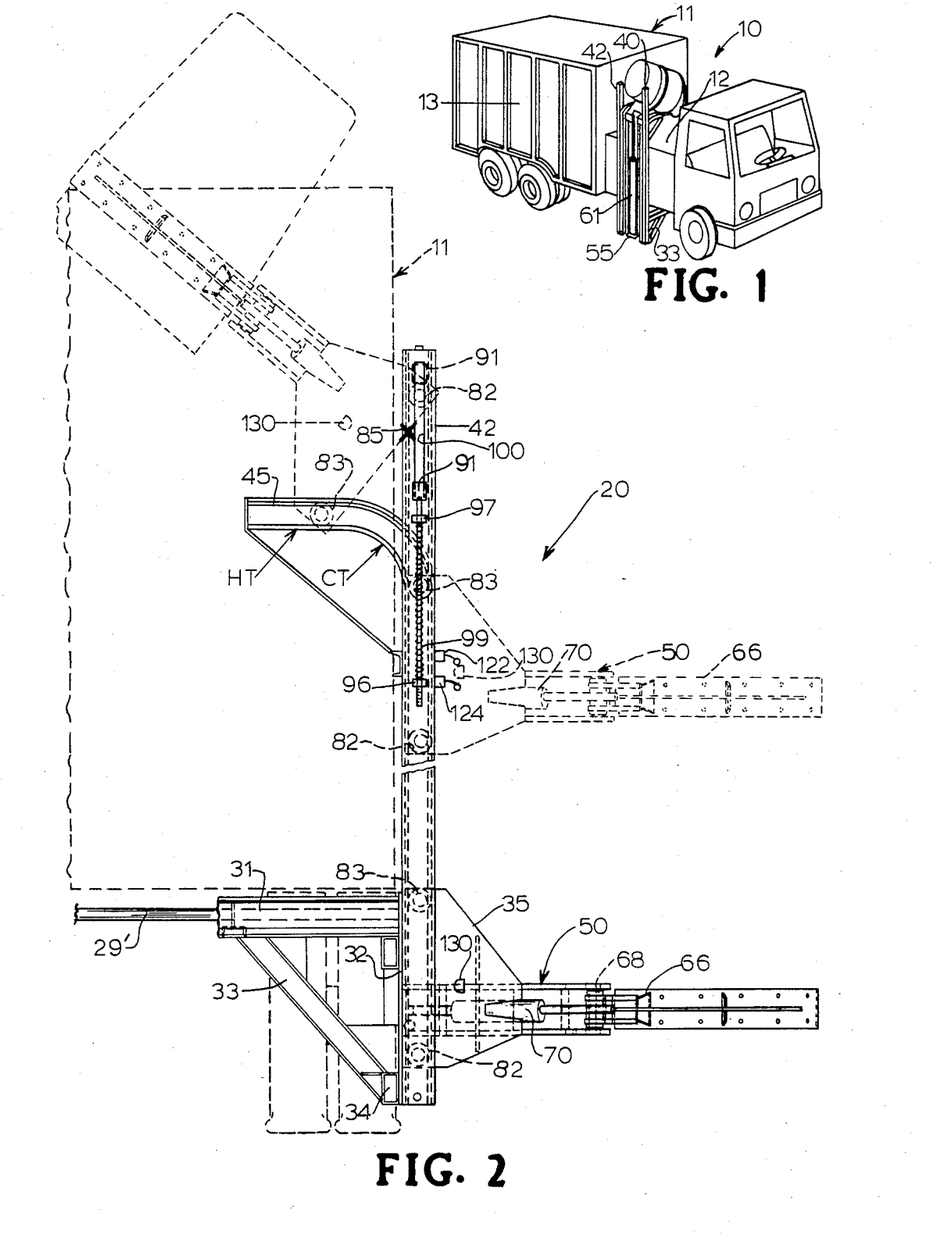
FIG. 1 is a perspective view of a typical side-loading trash collection vehicle incorporating the apparatus of the invention and in a dumping position.
FIG. 2 is a side elevation view of the invention apparatus, a portion of the trash collection vehicle being shown in dashed lines, illustrating in solid lines the container-grasping position, in dashed lines the intermediate container lift position and in dashed lines the container dump position.

Referring now to the drawings, and initially specifically to FIG. 1, a trash collection vehicle 10 is shown having a truck body 11. Body 11 includes a trash collection bin 12 for receiving trash to ultimately be compacted into the back compartment 13 of vehicle 10 for transportation to a landfill or trash collection center.

Figure 4:
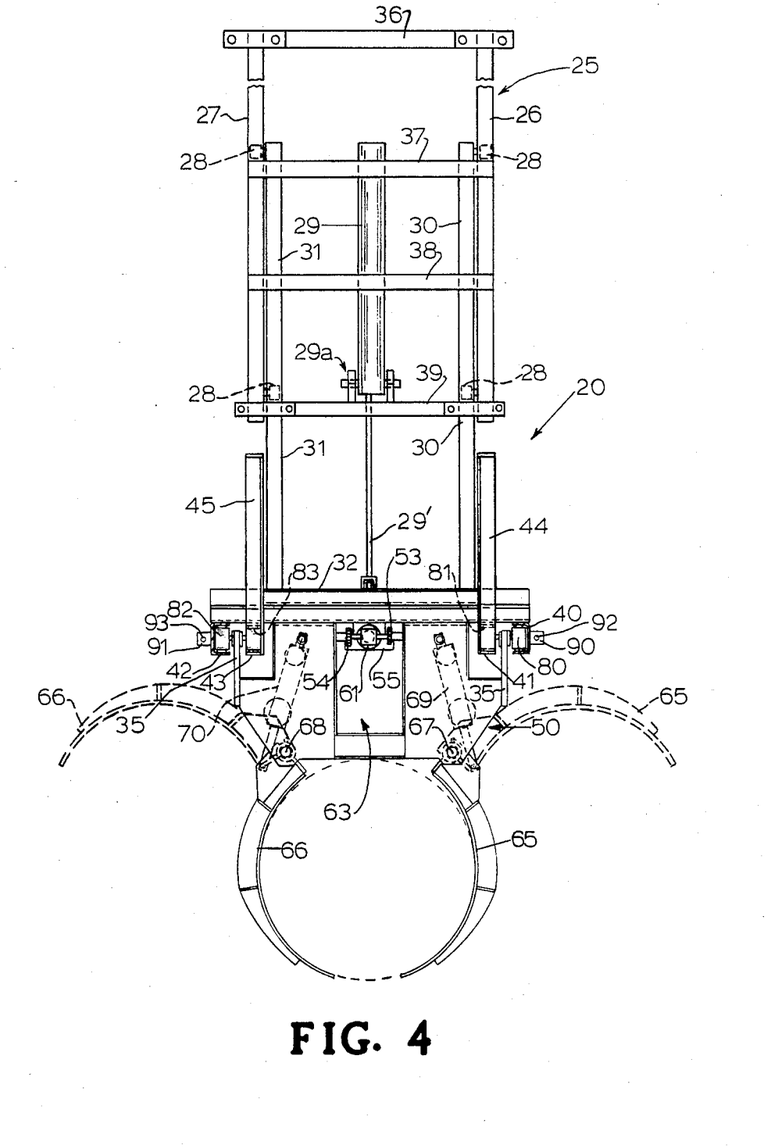
FIG. 4 is a top plan view of the FIG. 2 apparatus illustrating in solid lines the grasping position and in dashed lines the open or non-grasping position.

Trash collection apparatus 20 of the present invention utilizes a frame assembly 25 (FIG. 4) which is removably mounted beneath vehicle 10 and in the area below trash collection bin 12. Frame assembly 25 has a pair of fixedly-secured rails 26, 27 which extend outward horizontally from beneath vehicle 10 and cross bars 36, 37, 38, 39 extending between rails 26, 27. Channel rails 30, 31 are designed to move back and forth along rails 26, 27 by rollers 28 which are mounted on rails 26, 27, 30 and 31 and ride within rails 26, 27, 30 and 31. Rails 30, 31 are driven in and out by a piston rod 29' of piston/cylinder 29 with piston rod 29' being connected to back plate 32 which in turn is integrally secured to rails 30, 31 as best seen in FIGS. 2 and 4. Piston/cylinder 29 is pivotally secured at 29a to cross bar 39 (FIG. 4) and mounts below cross bars 37, 38. Such pivotal mounting arrangement facilitates the relatively long stroke of rod 29' without binding. Bracing 33 (FIG. 2) extends downwardly from channel rails 30, 31 to the lower base 34 of back plate 32.

Also mounted on opposite ends and on the outer face of plate 32 are two pairs of vertically disposed rail members 40, 41 and 42, 43. Rail members 41, 43 reside between rail members 40, 42. Vertical rail members 40, 41 oppose vertical rail members 42, 43 and provide opposed tracks. Rail members 40, 42 extend vertically and provide vertical tracks throughout their entire length. However, rail members 41 and 43 have curvilinear and horizontal upper end portions 44, 45 below the upper end portions of rail members 40, 42. The lower ends of rail members 41, 43 terminate at a level slightly higher than the lower ends of rail members 40, 42. However, for a substantial portion of their respective lengths, it will be seen that the vertical tracks provided by rail members 40, 41 oppose the tracks provided by rail members 42, 43. Further, it will be noted that the track of rail member 40 opposes the track of rail member 42 throughout their respective lengths and the track of rail member 44 opposes the track of rail member 45 throughout their respective lengths including the curvilinear and horizontal upper end portions 44, 45. Each of the rail members 40-43 is formed of U-shaped channel.

Each of rail members 40, 41, 42, 43 receives in its track or channel a carriage roller and guides the same during travel of the carriage. A trash container plate fabricated dump carriage 50 is mounted for movement along vertical guide rails 40, 41, 42 and 43. Carriage 50 is moved along the vertical guide rails 40-43 through a pair of lift chains 51, 52, each of which has one end secured to carriage 50. Chains 51, 52 are mounted over grooved traction wheels 53, 54, respectively. The other end of each of chains 51, 52 is secured to an outwardly-extending bracket 55 on back plate 32. Grooved traction wheels 53, 54 are rotatably mounted on the end of a hydraulic lifting piston rod 60 which is vertically extendable from a lifting cylinder/piston 61. Thus, as piston rod 60 is urged upwardly by the force of hydraulic fluid in cylinder/piston 61, grooved traction wheels 53, 54 are also forced upwardly and cause chains 51, 52 to lift carriage 50 to which they are attached. Cylinder/piston 61 mounts within a U-shaped opening 63 formed in carriage 50 and its operation and speed of operation are controlled in a unique manner covered in later description in reference to FIGS. 5-9.

It will, of course, be understood that since vertical rail members 40, 41, 42, 43 are mounted on face plate 32 which in turn mounts on horizontal rails 30, 31, operation of the hydraulic cylinder/piston 29 will effectively control lateral movement of the vertical rail members and carriage 50 with respect to the vehicle body. This aspect of the operation of the present invention will be seen as being generally similar to the action of the piston/cylinder 15 on rails 18 of prior art U.S. Pat. No. 4,313,707 with respect to providing means for grabbing and restoring the trash container at locations substantially removed from the side of the vehicle body. Therefore, since this operation will be readily understood from the explanation given in prior art U.S. Pat. No. 4,313,707 and since the present invention concerns itself with other aspects of novel construction, no further explanation is deemed necessary with respect to the operation of hydraulic cylinder/piston 29.

Carriage 50 provides a pair of container gripping arms 65, 66 which are mounted on carriage 50 through pins 67, 68, respectively. Gripping arms 65, 66 are designed to substantially grasp a trash container prior to the container being lifted and dumped into trash collection bin 12. Gripping arms 65, 66 are pivoted about their respective pivot pins 67, 68 through the use of gripping arms actuator cylinders 69, 70, respectively mounted between the top and bottom walls of cariage 50. Actuation of gripping arms hydraulic actuator cylinders 69, 70 moves gripping arms 65, 66 inward toward each other and outward away from each other in a horizontal plane as best illustrated in FIG. 4.

Figure 3:
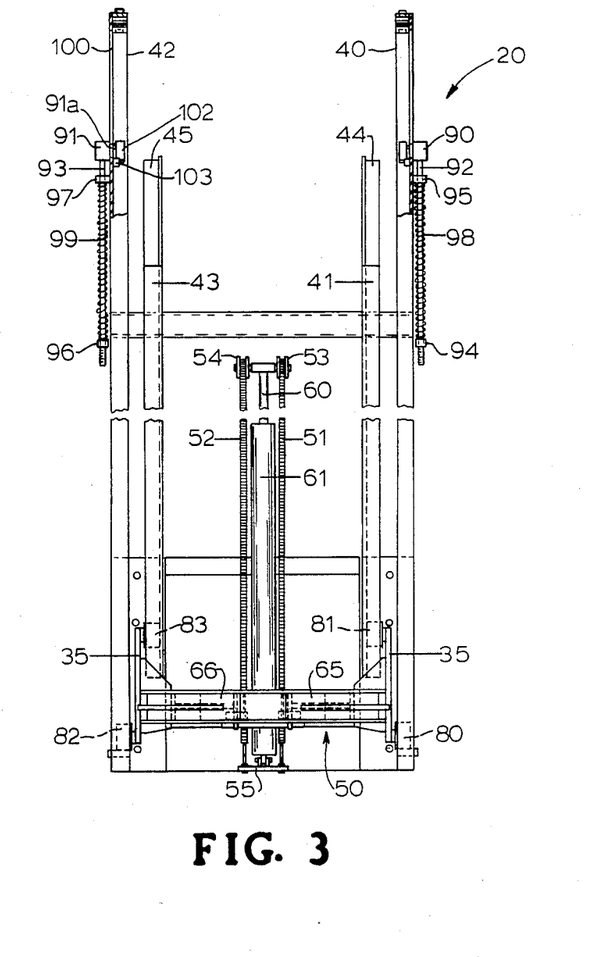
FIG. 3 is a front elevation view of the invention.

As stated earlier in the description, carriage 50 is movable vertically on guide rails 40, 41, 42 and 43 by chains 51, 52. This vertical movement is aided by two pairs of rollers 80, 81 and 82, 83 mounted on plates 35. As best seen in FIGS. 3 and 4, roller 80 rides in the track of vertical rail member 40; roller 81 rides in the track of the initially-vertical rail 41; roller 82 rides in the track of the vertical rail member 42; and roller 83 rides in the track of the initially vertical rail member 43. Rollers 81, 83 are mounted on carriage 50 such that they assume a position above rollers 80, 82 in the position seen in FIG. 3. Rollers 81, 83 will be referred to as the upper rollers and rollers 80, 82 as the lower rollers. As carriage 50 is raised by piston 60 through chains 51, 52, rollers 81, 83 move upward within the tracks of the initially-vertical rails 41, 43 and lower rollers 80, 82 move upward within the tracks of the vertical rail members 40, 42 as seen in FIG. 2. The curvilinear and horizontal upper end portions 44, 45 at the upper ends of vertical rail members 41, 43 provide a curved CT (FIG. 2) and then a horizontal HT pathway or track for rollers 81, 83 respectively, immediately prior to the container assuming a position for being dumped. Rollers 80, 82 are allowed to reach a considerably higher elevation in the tracks of vertical rails 40, 42 than the elevation reached by rollers 81, 83 in the curvilinear and horizontal tracks 44, 45 as best illustrated in FIG. 2. The travel of rollers 81, 83 in the curvilinear and horizontal track portions 44, 45 causes carriage 50 to be rotated counterclockwise, as viewed in FIG. 2. At the same time as rollers 80, 82 move upward to the maximum height in rails 40, 42, this causes further counterclockwise rotation of carriage 50 which in turn causes the trash container being held by gripping arms 65, 66 to be tilted into a dump position, as in FIGS. 1 and 2, so that the trash in the container is dumped into trash collection bin 12 of trash collection vehicle 10. The unique manner in which the carriage speed is controlled follows in later description.

Once empty, the trash container is returned to its ground-engaging position by reversal of the previously-described operation. In order to assure that rollers 80, 82 at the beginning of the reversal operation move towards their original position ahead of rollers 81, 83, rollers 80, 82 engage a pair of spring-loaded block mechanisms at the end of their upward travel. A travel overload arrangement is also employed as later explained in reference to FIG. 10. Blocks 90, 91 are secured respectively to rods 92, 93 which move up and down in fixed mount blocks 95 and 97, respectively. Compression spring 98 is mounted on rod 92 between block 95 and nut 94 and compression spring 99 is mounted on rod 93 between block 97 and nut 96 as seen in FIG. 3. In FIG. 3, rails 40 and 42 are broken away in order to illustrate the previously-mentioned spring-loaded mechanism. Block 91, which is mounted on rod 93, rides up and down on the outer side surface of rail 42. Block 91 has a small block 91a (FIG. 3) integrally secured thereto and which rides up and down in slot 100. Bolts 101 (FIG. 10) connect and align block 91a with block 102 inside rail 42. Block 102 in turn mounts a roller 103 for rolling engagement with roller 82. Roller 82 in its upward travel contacts roller 103 and as roller 82 moves block 102 upward within rail 42, spring 99 is compressed. A similar arrangement exists for rail 40 enabling roller 80 to compress spring 98 during upward travel.

As rollers 80, 82 move into their highest position, prior to dumping of the container, springs 98, 99 will thus be placed under compression and thus will be tending to urge rollers 80, 82 downward in opposition to the hydraulic pressure applied to piston rod 60 by cylinder/piston 61. However, when pressure within cylinder/piston 61 is redirected forcing piston rod 60 to move down, the now-compressed springs 98, 99 will force rollers 80, 82 downward in the tracks of rails 40, 42 ahead of downward travel of rollers 81, 83. Once rollers 80, 82 pass the position of rollers 81, 83, then rollers 81, 83 start moving downward in the curvilinear and horizontal portions 44, 45 and complete their travel downward in the tracks of vertical rails 41, 43. Thus, this spring compression arrangement provided by springs 98, 99 prevents rollers 81, 83 from attempting to return first and thereby possibly locking up carriage 50 on the vertical rails. An overtravel arrangement is also provided as later explained in reference to FIG. 10.

Carriage 50 is lowered by reversing the action of lifting piston rod 60 until carriage 50 is lowered to the point that the trash container comes into contact with the ground. Hydraulic cylinder/piston 29 is then appropriately activated to move the channel rails 30, 31 outward on rails 26, 27 to restore the container to its appropriate ground position. Gripping arm cylinders 69, 70 are then actuated to swing the gripping arms 65, 66 outward in a horizontal plane away from the trash container to release the container. Cylinder/piston 29 is then activated to retract carriage 50 by retracting channel rails 30, 31 rearward towards vehicle 10 on rails 26, 27. Carriage 50 is then restored back to a position adjacent the vehicle body.

Once carriage 50 has been moved to a position adjacent the vehicle body, vehicle 10 may now move to another location for further trash collection or if desirable, carriage 50 may be moved to the dumping position seen in FIG. 2 to minimize the overall width of vehicle 10 and invention apparatus 20 during travel to the next container location.

The illustrated hydraulic cylinder/piston mechanisms and control used for operating the frame beneath the vehicle to move the guide rails laterally and for moving the container gripping arms in and out to grip and release the container are conventional. However, a unique control system is provided for the hydraulic lifting cylinder/piston 61 as next explained in reference to FIGS. 5-9.

In addition to providing an improved straight rail and curved rail system for improving the manner in which the carriage and its container are dumped, the invention also provides an improved control system which enables the speed at which the carriage moves through the dumping operation to be reduced as compared to the speed at which the carriage and its container are raised vertically during the main lifting operation. Thus, excessive centrifugal forces that would otherwise be imposed on the carriage and its container particularly when carrying heavy or unbalanced loads are avoided. Reference is next made to FIGS. 5-9 in explanation of this improved speed control system for the carriage and its container.

Making reference to FIGS. 5-9, there is illustrated in schematic and simplified diagrammatic form a pneumatically-controlled system for controlling both direction and speed of stroke of the hydraulically-operated cylinder/piston 61. In the invention control system, the operator controls a directional control valve 105 for admitting hydraulic fluid to either line 110 to raise the piston rod 60 or line 112 to lower piston rod 60. Valve 105 is located between a pump 104 and tank 116 connected by transfer line 107 and forming part of the vehicle's hydraulic system also used to operate piston/cylinders 29, 69 and 70. A pneumatically-controlled dump valve 120 is set in respective open and closed positions by respective "open" momentary contact switch 122 and "close" momentary contact switch 124. Open switch 122 is positioned on the rails immediately above closed switch 124 as indicated in FIG. 2 and the switches are actuated in sequence by a suitable switch cam 130 on carriage 50 during the stage when the upper rollers 83 are either about to enter or about to leave the curved portion of rails 45. Open switch 122 serves to set dump valve 120 in the open position enabling hydraulic fluid to be dumped from either line 112 or line 110 into tank 116 dependent on the respective positions of the line connections 140, 142 in the pressure sensitive shuttle valve 145. Alternatively, close switch 124 serves to set dump valve 120 in the closed position to prevent any dumping. As will be apparent from the foregoing description, such dumping action provides a means for controlling the speed of piston rod 60 and thus the speed of carriage 50 in various stages of operation as next more fully described.

Figure 5:
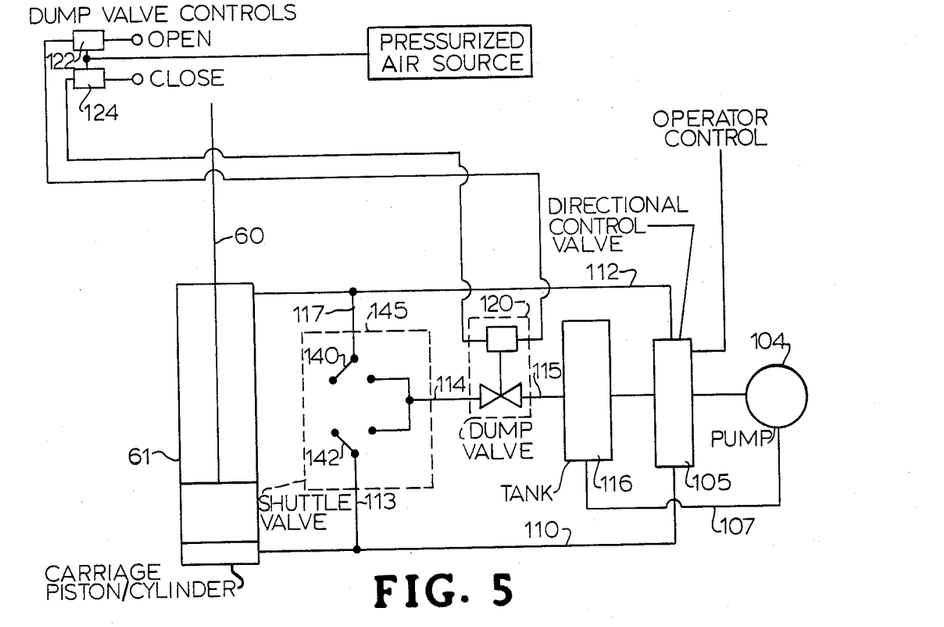
FIG. 5 is a simplified schematic diagram of the lift cylinder control system positioned with the cylinder at bottom rest.

With specific reference to FIG. 5, it is assumed that the piston/cylinder 61 is at its bottom rest position as, for example, when the piston/cylinder 29 is being operated to grasp or return a container before or after a container dumping operation. At this stage, line connections 140, 142 in the pressure-sensitive shuttle valve 145 are both open as illustrated in FIG. 5, dump valve 120 is in a closed position by reason of pneumatic switch 124 having been previously actuated to set dump valve 120 in a closed position when carriage 50 last descended. In the bottom rest position, it is thus further assumed that the operator control is in a neutral position so as to prevent pressurized hydraulic fluid from being admitted to either line 110 or line 112.

Figure 6:
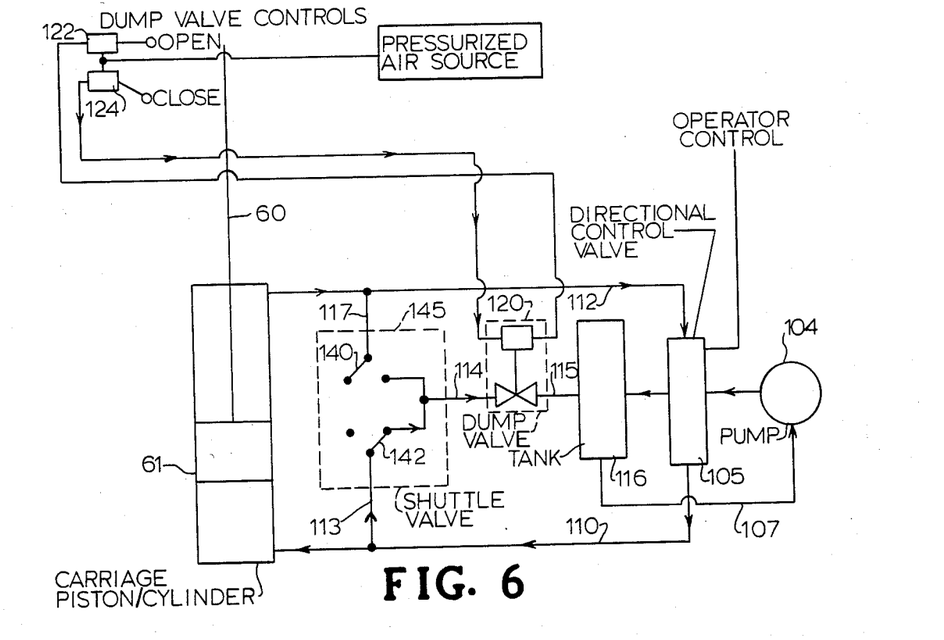
FIG. 6 illustrates the lift cylinder control system positioned as the cylinder starts to raise the carriage.
Figure 7:
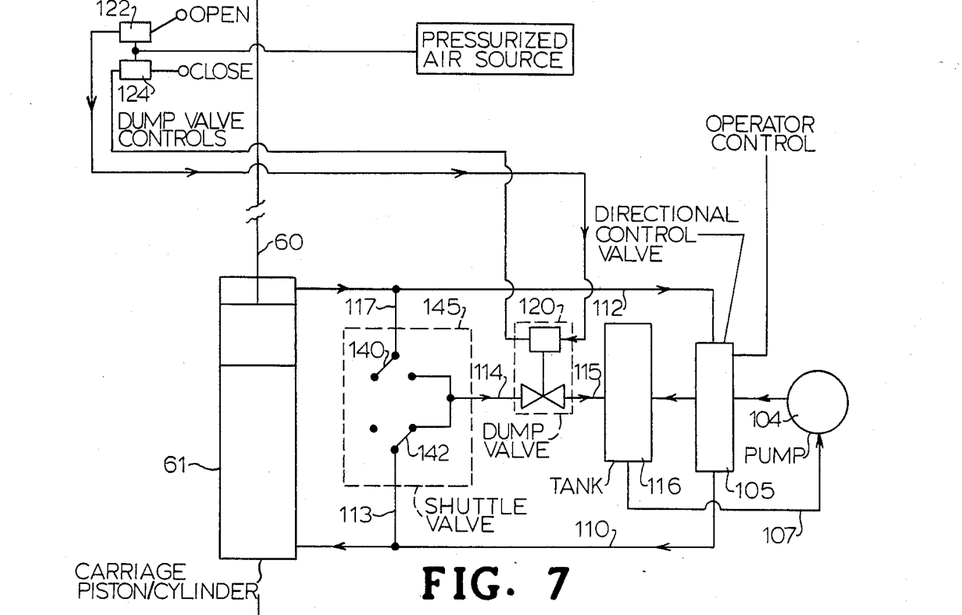
FIG. 7 illustrates the lift cylinder control system positioned as the carriage turns over in the raising motion and as the top carriage rollers enter the curved track section.

Making reference next to FIG. 6, it is assumed that through operator control, the direction valve 105 has been positioned so as to admit pressurized hydraulic fluid to line 110 which serves to cause the piston/cylinder 61 to start raising piston rod 60 and at the same time line connection 142 under the influence of pressure in line 113 is caused to switch to the closed position indicated in FIG. 6, thus allowing line 114 to become pressurized but blocked by closed dump valve 120. As carriage 50 continues to rise and as the upper rollers 83 start entering the curved tracks 45, switch cam 130 first actuates closed switch 124 which has no effect on dump valve 120 because of already being in the closed position. However, as carriage 50 continues to rise, cam 130 next actuates open switch 122 which acts to set dump valve 120 in the open position and thus allows a portion of the hydraulic fluid coming from line 110 to be diverted through line 113, line connection 142, line 114 and line 115 to be dumped into tank 116 thereby reducing the speed of travel of piston rod 60 and carriage 50 as carriage 50 moves into its final dumping position. This last-mentioned mode of operation is illustrated in FIG. 7 and the control conditions illustrated in FIG. 7 remain fixed until piston rod 60 is completely extended. Dump valve 120 has an adjustable opening and thus by adjusting the flow through valve 120 the speed of cylinder rod 60 and carriage 50 can be controlled accordingly.

Figure 8:
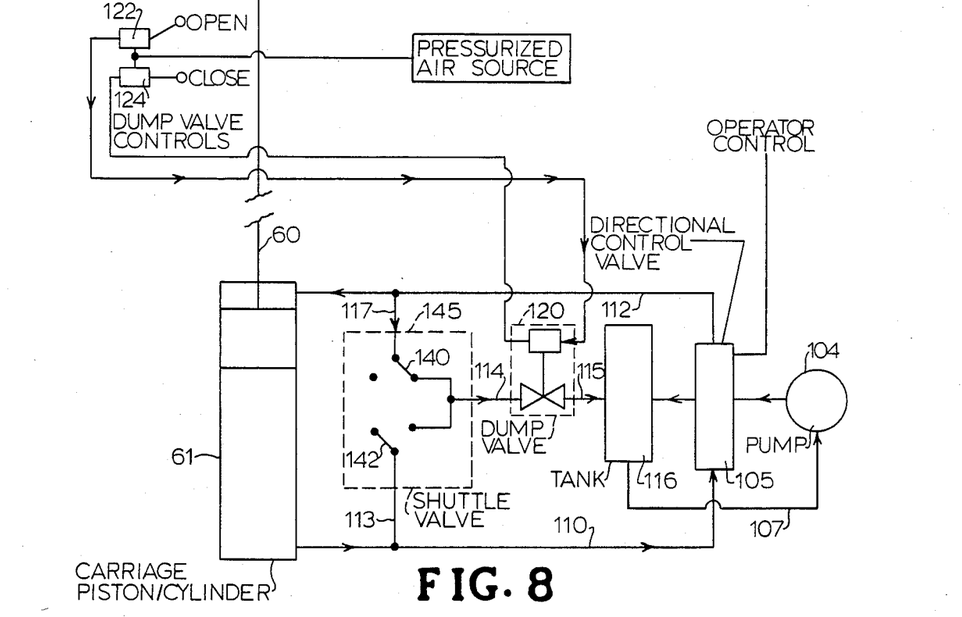
FIG. 8 illustrates the lift cylinder control system positioned as the carriage rollers start back down in the curved track.

It is next assumed that the container has been dumped and that the operator controls have been positioned so as to allow the directional control valve 105 to admit pressurized hydraulic fluid into line 112 so as to start piston rod 60 and carriage 50 in the downward direction on the rails. At the beginning of this operation, dump valve 120 remains set in the open condition. Thus, as illustrated in FIG. 8, the pressure in line 112 causes line connection 140 of shuttle valve 145 to close enabling a portion of the hydraulic fluid to be dumped through lines 117, 114 and 115 to tank 116. Thus, during the initial stages of carriage 50 starting back down through the curved track, carriage 50 is operating at reduced speed.

Figure 9:
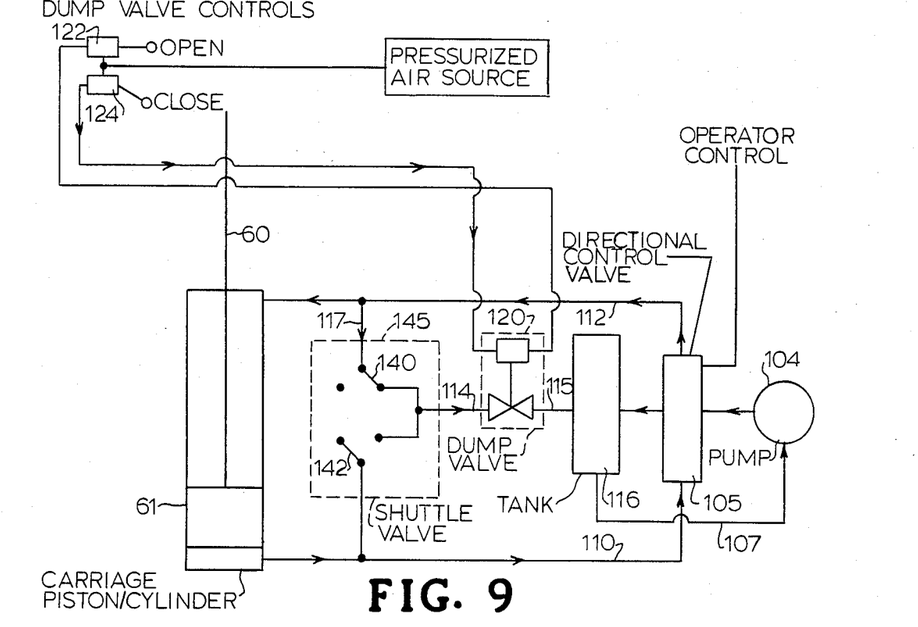
FIG. 9 illustrates the lift cylinder control system positioned as the carriage rollers moving down leave the curved track and enter the straight track.

As carriage 50 comes out of the curved track, switch cam 130 will actuate the close switch 124 which sets dump valve 120 in the closed position and thus blocks the flow of the hydraulic fluid through dump valve 120. All of the pressurized fluid coming from line 112 is thus directed to the piston/cylinder 61 as illustrated in FIG. 9 until the piston/cylinder 61 returns to the bottom rest postion at which time the operator will again reposition the directional control valve 105 such that the system is restored to the status indicated in FIG. 5.

Figure 10:
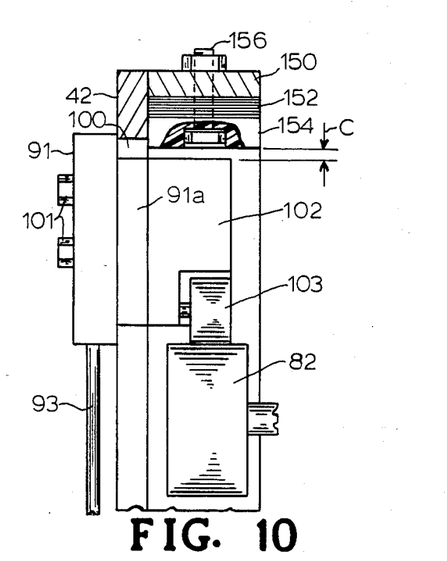
FIG. 10 illustrates in a partial view the overtravel stop arrangement at the top of each vertical rail with the carriage assumed to be at its dumping position with certain parts of the rail sectioned for illustration and taken generally in the direction of FIG. 3.

In another aspect of the invention, it is recognized that when the container is being dumped there may be a tendency for the load to shift about the axis 85 (FIG. 2) passing near or through the traction wheels 53, 54 when piston rod 60 is at the top of its stroke. Also, if a single heavy load, e.g., an electric motor being scrapped, was being dumped out of the container, this might also tend to pivot the container and carriage about the mentioned axis 85. In any event, such pivoting action, unless otherwise dealt with, could cause carriage 50 and the rollers 82, 83 to jam in such position that carriage 50 could not return to the ground position. To offset this possibility, there is illustrated in FIG. 10 the type of overtravel mechanism provided at the top of each vertical rail 40, 42. Using the rail 42 construction as an example and making reference to FIG. 10, a plate 150 is secured to the top of rail 42 and mounts a resilient rubber pad 154 and a pack of metal shims 152 by means of a bolt 156. As previously described, block 91 is secured to rod 93 and slides on the outer surface of rail 42. The previously-mentioned spacer block 91a slides up and down in slot 100 and in turn is secured to block 102 which mounts roller 103. Bolts 101 pass through block 91 spacer block 91a, and are secured into block 102. When carriage 50 rises, the upper carriage roller 82 strikes roller 103 and thus causes rod 93 to rise and compress spring 99 as previously described. At the uppermost position of block 102 there is provided a normal clearance C which is established when the container is empty and is typically about one-eighth inch. Under normal dumping conditions, block 102 does not come in contact with the resilient pad 154. However, in the event of an unusually heavy load or other dumping situation in which the container and carriage attempt to tilt excessively around the mentioned axis 85, block 102 is allowed to contact and compress the resilient rubber pad 154 during the time when such abnormal unloading condition is being experienced. However, once the abnormal load has left the container, the resilience of pad 154 tends to force block 102 down and back to the position where there is reestablished the desired clearance C indicated in FIG. 10. Thus, after the container has been emptied and immediately prior to the time when the carriage and container are to start on their return travel, carriage 50 would be repivoted back to its normal position by reason of the described overtravel arrangement illustrated in FIG. 10. The exact amount of clearance C can, of course, be adjusted by adding and removing individual shims from the shim pack 152. It is also to be understood that the overtravel arrangement shown in FIG. 10 and explained in connection with rail 42 is also duplicated on rail 40 and is of similar construction and operates in a similar manner.

From the foregoing, it can be seen that there has been provided a novel track and carriage return arrangement which in actual practice has proven to be a substantial improvement for the grabbing, lifting and dumping operations associated with side-loading apparatus of the kind dealt with by the present invention.

What is claimed is:

1. Apparatus for grasping, lifting and tipping a trash loaded container into a receptacle on a side-loading trash collection vehicle and thereafter lowering and releasing the container, comprising:
   (a) a frame mounted below said receptacle;
   (b) means for moving the frame laterally with respect to said receptacle;
   (c) a pair of opposed upwardly extending laterally spaced guide rails supported on each side of and movable with said frame and having:
      (i) the tracks of one pair opposing the tracks of other pair;
      (ii) the lower ends of both pairs supported on said frame;
      (iii) a first member of each pair providing a continuous flat surfaced vertical track throughout its length; and
      (iv) a second member of each pair providing a continuous flat surfaced track the major portion of which is vertical and laterally opposite the track of the first member of the same pair and having an upper end minor portion providing a curved track as a continuation of said second member vertical track and as a continuation of said curved track a horizontal track, said curved and horizontal tracks being directed toward an opening in the top of said receptacle and located at a level below the upper end of said first member of the same pair;
   (d) a traveling carriage having a pair of outwardly extending pivotal container gripping arms disposed horizontally when resting at the bottom of said side rails, a first set of upper rollers mounted for traveling and during traveling to be always confined on the tracks of the said second members of said pairs of guide rails and a second set of lower rollers mounted for traveling and during traveling to be always confined on the tracks of the said first members of said pairs of guide rails;
   (e) a pair of hydraulic cylinder actuated means mounted on said carriage for moving said gripping arms in and out to grip and release said container at a position spaced outwardly from said rails;
   (f) operator-controllable fluid actuated piston/cylinder means operatively associated with and adapted for lifting and lowering said carriage along said guide rails whereby when said carriage is raised by said lifting means to the extent of the stroke of said piston/cylinder means, said carriage and gripping arms are pivoted and the container carried thereby is upended while remaining in the grasp of said arms as said upper set of rollers are guided onto said curved and horizontal tracks of said guide rail second members followed by said lower set of rollers being guided to the top of said guide rail first members to reside above said upper rollers; and (g) carriage reversing means comprising:
  (i) contact means adapted for being operatively engaged by upward movement of said carriage and while engaged moving with each said lower roller traveling on each said first rail member during a terminal portion of the upward travel thereof; and
  (ii) spring means operatively associated with said contact means and compressed in coordination with upward travel of said contact means whereby when said piston/cylinder means starts said carriage on a return travel release of the compression of said spring means acts to force said upper rollers to travel on respective said horizontal and curved tracks and force the lower roller to return downwardly ahead of and to lead said upper rollers traveling on said second member tracks during the initial stage of said return travel; and (h) adjustable means for controlling the fluid supply to said piston/cylinder means in coordination with lifting, tilting and lowering of said carriage enabling the speed of said carriage to be reduced as it approaches, tilts, and leaves the upper limits of its travel.

2. Apparatus as claimed in claim 1 wherein said contact means is operatively engaged by being engaged with each said lower roller during upward travel thereof.

3. Apparauts as claimed in claim 1 wherein said carriage is fabricated with a U-shaped opening formed within a pair of top and bottom walls, said piston/cylinder means includes a cylinder mounted to extend through said opening during lowering of said carriage and said pair of gripping arm hydraulic cylinder actuated means are mounted on opposite sides of said opening and between said top and bottom walls of said carriage.

* * * * *